(12) United States Patent
Samuelsson et al.

(10) Patent No.: US 7,739,720 B2
(45) Date of Patent: Jun. 15, 2010

(54) METHOD AND SYSTEM FOR MERGING SECURITY POLICIES

(75) Inventors: Anders Samuelsson, Redmond, WA (US); Maxim Alexandrovich Ivanov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 10/966,800

(22) Filed: Oct. 14, 2004

(65) Prior Publication Data

US 2006/0085838 A1    Apr. 20, 2006

(51) Int. Cl.
*G06F 17/00* (2006.01)
*H04L 29/06* (2006.01)

(52) U.S. Cl. ......................................................... 726/1
(58) Field of Classification Search ...................... 726/1
See application file for complete search history.

(56) References Cited

U.S. PATENT DOCUMENTS

| | | | | |
|---|---|---|---|---|
| 5,768,504 | A * | 6/1998 | Kells et al. ...................... | 726/6 |
| 6,947,985 | B2 * | 9/2005 | Hegli et al. ..................... | 709/224 |
| 7,149,873 | B2 * | 12/2006 | Mohideen et al. .............. | 711/212 |
| 7,451,477 | B2 * | 11/2008 | Griffin et al. ................... | 726/1 |
| 7,523,200 | B2 * | 4/2009 | Gross et al. .................... | 709/225 |
| 7,523,483 | B2 * | 4/2009 | Dogan et al. .................... | 726/1 |
| 2003/0009685 | A1 | 1/2003 | Choo et al. | |
| 2003/0115476 | A1 * | 6/2003 | McKee ........................ | 713/193 |
| 2003/0145235 | A1 | 7/2003 | Choo | |
| 2003/0177389 | A1 | 9/2003 | Anthony et al. | |
| 2004/0054894 | A1 * | 3/2004 | Lambert ....................... | 713/165 |
| 2005/0102505 | A1 * | 5/2005 | Chung et al. .................. | 713/164 |
| 2006/0005227 | A1 * | 1/2006 | Samuelsson et al. ........... | 726/1 |

OTHER PUBLICATIONS

European Search Report, European Patent Application No. 05 10 8854, Microsoft Corporation, Oct. 30, 2007 (3 pages).

* cited by examiner

*Primary Examiner*—Kambiz Zand
*Assistant Examiner*—Benjamin A Kaplan
(74) *Attorney, Agent, or Firm*—Perkins Coie LLP

(57) ABSTRACT

A method and system for combining and enforcing security policies is provided. The security system is provided with security policies that have process set criteria and associated rules. The security system combines the security policies by generating a rule list of the security policies and associated process set criteria. The rules of the rule list are ordered based on rule type and action of the rule. When a new process is started to execute an application, the security system determines the process set criteria that are satisfied by the application. The security system then identifies the rules of the rule list that are associated with the satisfied process set criteria. When a security enforcement event associated with the process occurs, the security system applies each of the rules associated with the process to the security enforcement event in an order specified by the rule list.

19 Claims, 8 Drawing Sheets

METHOD AND SYSTEM FOR MERGING SECURITY POLICIES

TECHNICAL FIELD

The described technology relates generally to security systems that prevent the exploitation of a vulnerability of a software system.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" or updates to the software system that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the software system and possibly the computer system on which it is executing may need to be shut down and restarted. If the vulnerability is in a software system that is critical to the success of an organization, then the administrator needs to analyze the tradeoffs of keeping the software system up and running with its associated risk of being attacked and of shutting down a critical resource of the enterprise to install the patch. Some administrators may delay the installation of the patch because they fear that, because of a hasty distribution, it might not be properly tested and have unintended side effects. If the patch has an unintended side effect, then the software system, the computer system, or some other software component that is impacted by the patch may be shut down by the patch itself. Administrators need to factor in the possibility of an unintended side effect when deciding whether to install a patch. These administrators may delay installing a patch until experience by others indicates that there are no serious unintended side effects.

Intrusion detection systems have been developed that can be used to identify whether an attempt is being made to exploit a known vulnerability that has not yet been patched. These intrusion detection systems can be used to prevent exploitations of newly discovered vulnerabilities for which patches have not yet been developed or installed. These intrusion detection systems may define a "signature" for each way a vulnerability can be exploited. For example, if a vulnerability can be exploited by sending a certain type of message with a certain attribute, then the signature for that exploitation would specify that type and attribute. When a security enforcement event occurs, such as the receipt of a message, the intrusion detection system checks its signatures to determine whether any match the security enforcement event. If so, the intrusion detection system may take action to prevent the exploitation, such as dropping the message.

Signatures for newly discovered exploitations of vulnerabilities can be created in different ways. Developers of intrusion detection systems may create and distribute new signatures when they become aware of new exploitations. An administrator can then install the new signatures to prevent the exploitation. A developer may not, however, provide signatures for all known exploitations. For example, the vulnerability may be in a special-purpose application program that the developer does not support. To prevent exploitation of such a vulnerability, intrusion detection systems may allow administrators to create their own signatures.

A set of one or more signatures may be considered a security policy. Developers of intrusion detection systems may provide various security policies. For example, a developer may provide one security policy that defines signatures of vulnerabilities of an operating system and many other security policies that are specific to an application or a class of applications. Similarly, an administrator may define a security policy that is specific to custom applications used by the enterprise.

Intrusion detection systems typically can enforce only one security policy. In such a case, multiple security policies would need to be combined or merged into a single security policy that is provided to the intrusion detection system. To combine security policies, the developer of the intrusion detection system or an administrator would typically review the various security policies and try to merge the logic of the signatures so that the net effect of each security policy is implemented. However, because the signatures can be very complex and the effects of and interactions between different security policies can also be both complex and subtle, the combining of security policies can be time-consuming and prone to errors.

It would be desirable to have a mechanism that would automatically combine the effects of security policies into a combined security policy that can be efficiently enforced.

SUMMARY

A method and system for combining and enforcing security policies is provided. The security system is provided with security policies that have process set criteria and associated rules. A process set criterion defines the attributes of a process or application to which the associated rules are to be applied. A rule provides a condition and action to be performed when the condition is satisfied. The security system combines the security policies in a user mode and enforces the combined security policies in kernel mode. The security system combines the security policies by generating a rule list that is a list of the rules of the security policies. Each rule of the rule list has an associated process set criterion derived from the security policy. The rules of the rule list are ordered based on rule type (e.g., global rule) and action of the rule. The security system uses the rule list in kernel mode to enforce the security policies. When a new process is started to execute an application, the security system determines the process set criteria that are satisfied by the application. The security system then identifies the rules of the rule list that are associated with the satisfied process set criteria. The security system associates these identified rules with the process. When a security enforcement event associated with the process occurs, the security system applies each of the rules associated with the process to the security enforcement event in an order specified by the rule list.

DETAILED DESCRIPTION

Figure 1:
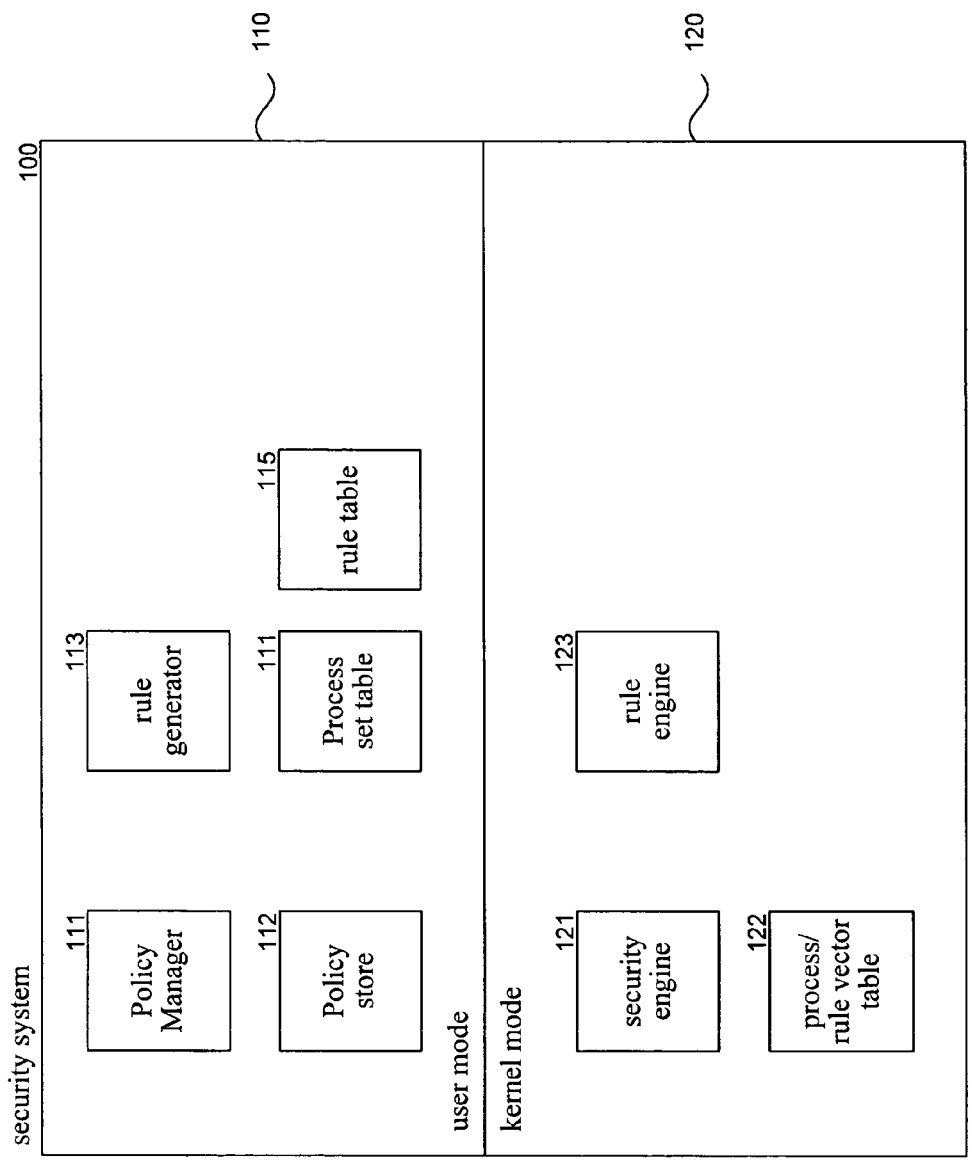
FIG. 1 is a block diagram that illustrates components of the security system in one embodiment.

A method and system for combining and enforcing security policies is provided. The collection of security policies that are to be enforced represents the overall security policy of an organization. In one embodiment, the security system is provided with security policies that have process set criteria and associated rules. A process set criterion defines the attributes of a process or application to which the associated rules are to be applied. For example, a process set criterion may be a list of application names or a regular expression defining a matching application name. Other attributes of an application that may be used for the process set criterion include the name of the directory containing the executable, developer of the application (e.g., Microsoft), registry entries associated with the application, and so on. If a process is executing an application that matches a process set criterion, then the associated rules apply to the process. Each rule may have a rule type, a condition, and an action. For example, a rule type may specify whether a rule is global, application-specific, or default. A global rule is applied to all processes that satisfy the process set criterion associated with the rule. An application-specific rule is applied to only those processes that satisfy the process set criterion associated with the rule and that are further specifically identified by the rule. A default rule is applied when no global rule or application-specific rule applies. In one embodiment, the rule type refers to the "execution scope" as described below in detail.

The security system combines the security policies in a user mode and enforces the combined security policies in kernel mode. The security system combines the security policies by generating a rule list that includes a list of the rules of the security policies. Each rule of the rule list has an associated process set criterion derived from the security policy. Furthermore, the rules of the rule list are ordered based on rule type and action of the rule. For example, global rules may be ordered before application-specific rules, which may be ordered before default rules. Each group of rules with the same rule type is referred to as a "rule set." Within each rule set, the rules may be ordered based on their actions. For example, rules with a "deny" action may be ordered before rules with an "allow" action.

The security system uses the rule list in kernel mode to enforce the security policies. When a new process is started to execute an application, the security system determines the process set criteria that are satisfied by the application. The security system then identifies the rules of the rule list that are associated with the satisfied process set criteria. The security system associates these identified rules with the process. When a security enforcement event associated with the process occurs, the security system applies each of the rules associated with the process to the security enforcement event in an order specified by the rule list. If a condition of an applied rule is satisfied and the associated action is deny, then the security system denies the activity associated with the security enforcement event and stops applying the rules.

The security system supports the dynamic updating and enforcement of security policies. The overall security policy may be updated by adding a new security policy or updating an existing security policy. A security policy may be updated by changing a process set criterion or a rule. When an overall security policy is updated, the security system regenerates a rule list and provides an indication of the change. The security system in kernel mode recognizes the change and dynamically updates the rules associated with the executing processes.

By selectively ordering rules based on rule type and by mapping process set criteria to associated rules, the security system can automatically combine and efficiently enforce security policies.

In one embodiment, a security policy includes rules that specify conditions, actions, and optionally exceptions. For example, a rule may indicate that an application may not receive messages on any network port other than port 80. The condition of the rule may detect that a message was received on a network port other than port 80, and the deny action may result in the message being discarded. As another example, a rule may indicate that when an application attempts to send a message on network port 80, authorization is to be solicited from a user of the computing system on which the rule is enforced. The rules may be categorized into security types based on their behavior. For example, rules with a network security type may be directed to security enforcement for network traffic. Each security type may have its own security engine for enforcing rules of that security type.

The condition, action, and exception of the rules may be specified as expressions. A rule may be semantically expressed as "IF conditions THEN actions EXCEPT exceptions." Conditions of a rule are expressions of circumstances under which security enforcement actions of the rule are to be performed. An action is an expression of activity to be performed when the condition is satisfied. A rule may have multiple actions. An exception is an expression of when the actions may not be performed even though the condition is satisfied. A condition may be either static or dynamic. A static condition is one which refers, for example, to a hard-coded list of files. A dynamic condition is one which, for example, performs a query to determine a list of files matching a provided criterion. Security enforcement actions may include allowing a request that caused the security enforcement event, denying the request, soliciting input from a user, notifying the user, and so on. Other rule constructs are also possible. As an example, an "else" construct could be added to perform alternate actions when a condition is false.

In one embodiment, a security policy may specify default rules and actions. When a security enforcement event does not satisfy any of the conditions of the rules of the security policy, a default action may be performed. For example, the default action for one security policy may be to allow the activity that generated the security enforcement event and for another security policy may be to deny the activity.

A security policy may group rules into multiple rule scopes. Scopes may be defined at various levels, and these levels may have a hierarchical relationship. For example, scopes may be defined at an application level, execution level, and protection level. Each application level may have an execution level, and each execution level may have a protection level. An application-level scope may identify all rules associated with a software resource. In one embodiment, the application-level scope defines the process set criterion for a group of rules, and the execution-level and protection-level scopes may be part of the condition of a rule. For example, application-level scopes may be indicated for a network protocol stack, web browser application, word processing application, and database application. An execution-level scope may identify rules associated with an execution context of an application. As an example, a web-browsing application may have execution-level scopes for its hypertext transfer protocol, file transfer protocol, and "telnet" execution contexts. Each execution-level scope may have one or more protection-level scopes. A protection-level scope may identify whether a rule is global, resource-specific, or default. When a rule is global, the rule applies to all processes that are within the application-level and execution-level scopes regardless of which resource (e.g., file system) caused the security enforcement event. When a rule is resource-specific, the rule applies only when an identified resource caused a security enforcement event relating to the rule. When a rule is default, the rule may apply to all resources not specifically identified in the resource-specific rules.

FIG. 1 is a block diagram that illustrates components of the security system in one embodiment. The security system 100 includes user-mode components 110 and kernel-mode components 120. The user-mode components include a policy manager component 111, a policy store 112, a rule generator component 113, a process set table 114, and a rule table 115. The policy manager component retrieves security policies from the policy store, generates protection objects for the security policies, and provides the protection objects to the rule generator component. The policy manager component generates a protection object for each type of rule and process set criterion within a security policy. Thus, a protection object includes a rule type, process set criterion, and an associated rule set. The rule generator component inputs the protection objects and generates a rule list that is stored in the process set table and the rule table. The rule generator component adds an entry to the process set table for each process set criterion in the protection objects. The rule generator component splits the rule set of a protection object into multiple rule sets that each have the same action type. For example, a rule set is generated for those rules with an action of deny and a separate rule set is generated for those rules with an action of allow. This splitting of a rule set facilitates the ordering of rules based on action. The rule generator component also creates a rule set for the default actions associated with a protection object. The rule generator component then stores each rule of each rule set in the rule table. The rules in the rule table are ordered according to rule type and within rule type according to the action of the rule. Each split rule set represents a contiguous ordering of the rules within the rule set. The rule generator component sets the entries of the process set table to point to each rule that is associated with the process set criterion of the entry. For example, if a process set criterion is associated with five different rules, then the entry for that process set criterion would identify the five rules. After generating the rule list (i.e., the process set table and the rule table), the user-mode component of the security system notifies the kernel-mode component.

The kernel-mode component of the security system includes a security engine component 121, a process/rule vector table 122, and a rule engine component 123. The security engine component is notified whenever a security enforcement event occurs. The security engine component identifies the process to which the event applies and retrieves a rule vector from the process/rule vector table for that process. The rule vector identifies the rules within the rule table that apply to that process. The security engine component then applies each rule of the rule vector to the security enforcement event in an order based on the ordering of the rule table. The security engine component invokes the rule engine component to provide the rule vectors for the processes. The rule engine component identifies the process set criteria that are satisfied by a process and retrieves an indication of each rule associated with a satisfied process set criteria. The rule engine component then combines the identifications of the rules into a rule vector that is then provided to the security engine component.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The security system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The client computer systems may be cell phones, personal digital assistants, smart phones, personal computers, programmable consumer electronics, digital cameras, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
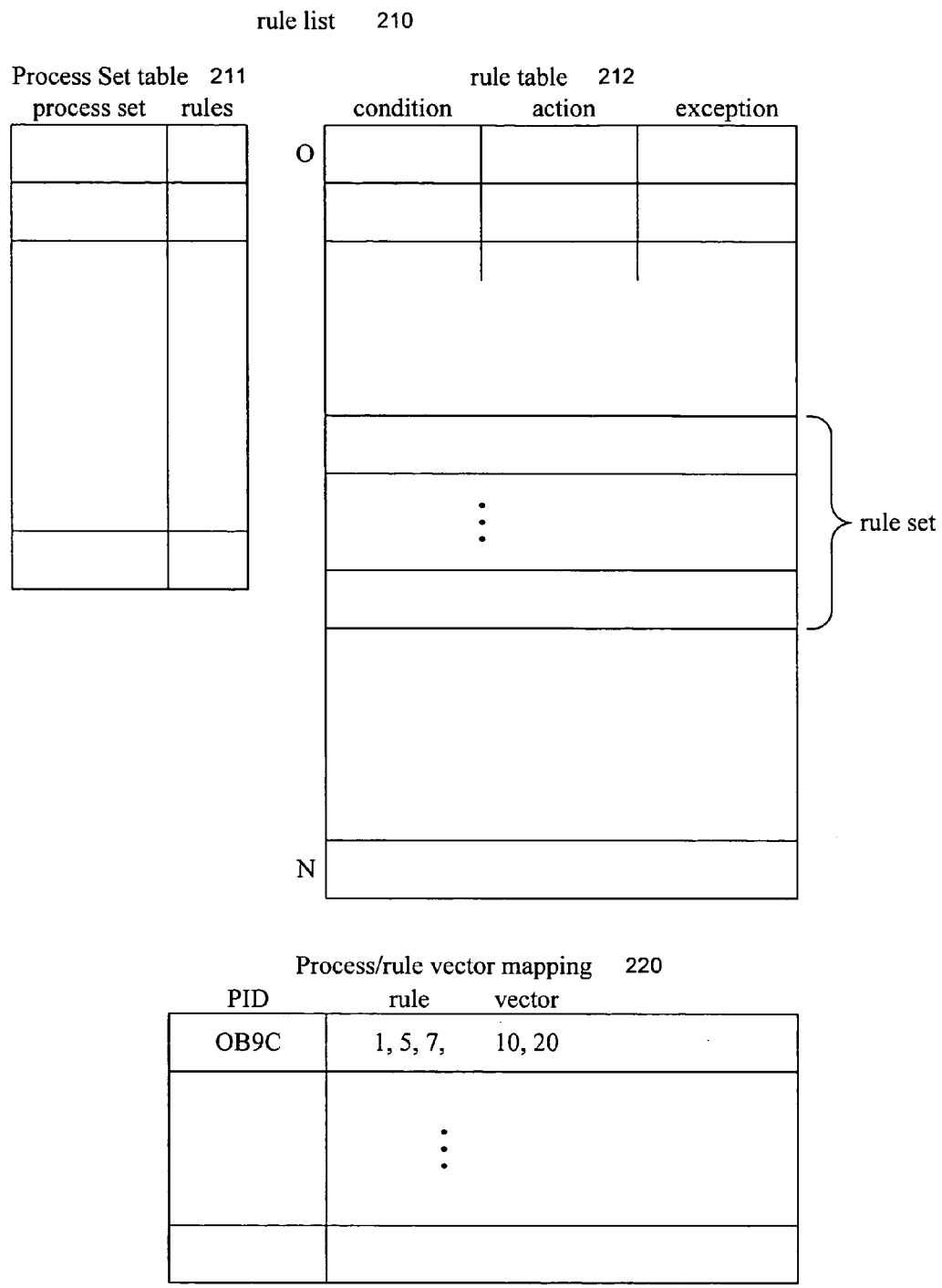
FIG. 2 is a block diagram that illustrates data structures of the security system in one embodiment.

FIG. 2 is a block diagram that illustrates data structures of the security system in one embodiment. A rule list 210 comprises a process set table 211 and a rule table 212. The process set table includes an entry for each process set criterion of a security policy. Each entry maps a process set criterion to the associated rules in the rule table. The rule table contains an entry for each rule of a security policy. The entries identify the condition, action, and exception of the rules. The rules of the rule table are ordered based on rule type and action. A process/rule vector mapping 220 identifies the rules that are applicable to each process. The mapping includes an entry for each process that identifies the process and the associated rule vector. One skilled in the art will appreciate that these data structures illustrate one possible logical organization of the data structures. Other organizations of the data structures may be appropriate depending on memory usage and computation speed goals.

Figure 3:
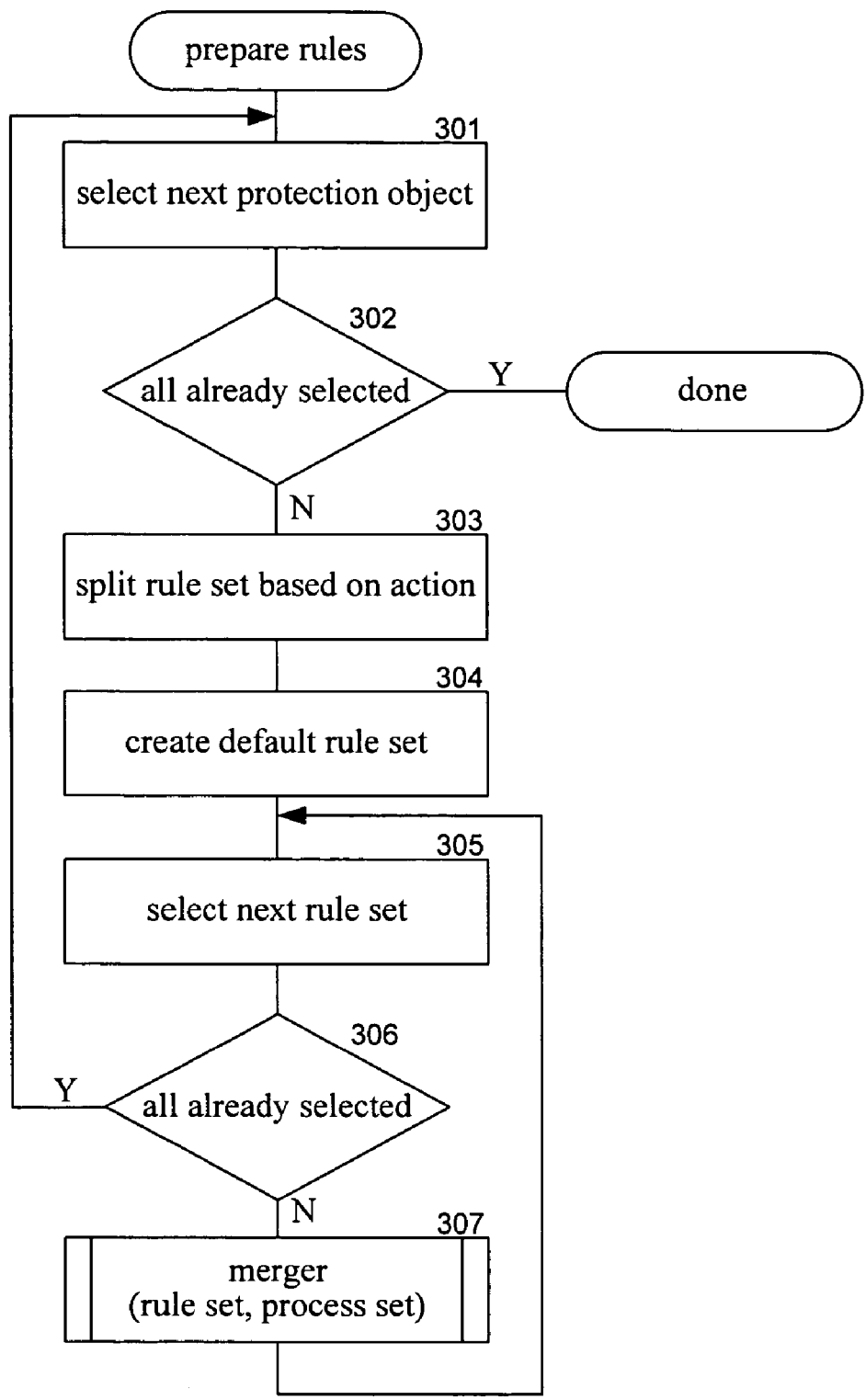
FIG. 3 is a flow diagram that illustrates the processing of a prepare rules component of the rule generator in one embodiment.

FIG. 3 is a flow diagram that illustrates the processing of a prepare rules component of the rule generator in one embodiment. The component executes in a user privilege mode. The component loops processing each protection object provided by the policy manager component. In block 301, the component selects the next protection object. In decision block 302, if all the protection objects have already been selected, then the component completes, else the component continues at block 303. In block 303, the component splits the rules of the protection object into various rule sets based on the actions of the rules. In block 304, the component creates a rule set for the default actions. In blocks 305-307, the component loops adding the rules of the rule sets to the rule list. In block 305, the component selects the next rule set. In decision block 306, if all the rule sets have already been selected, then the component loops to block 301 to select the next protection object, else the component continues at block 307. In block 307, the component invokes a merge component passing the selected rule set and the process set criterion of the protection object to add the rules and the process set criterion to the rule list. The component then loops to block 305 to select the next rule set.

Figure 4:
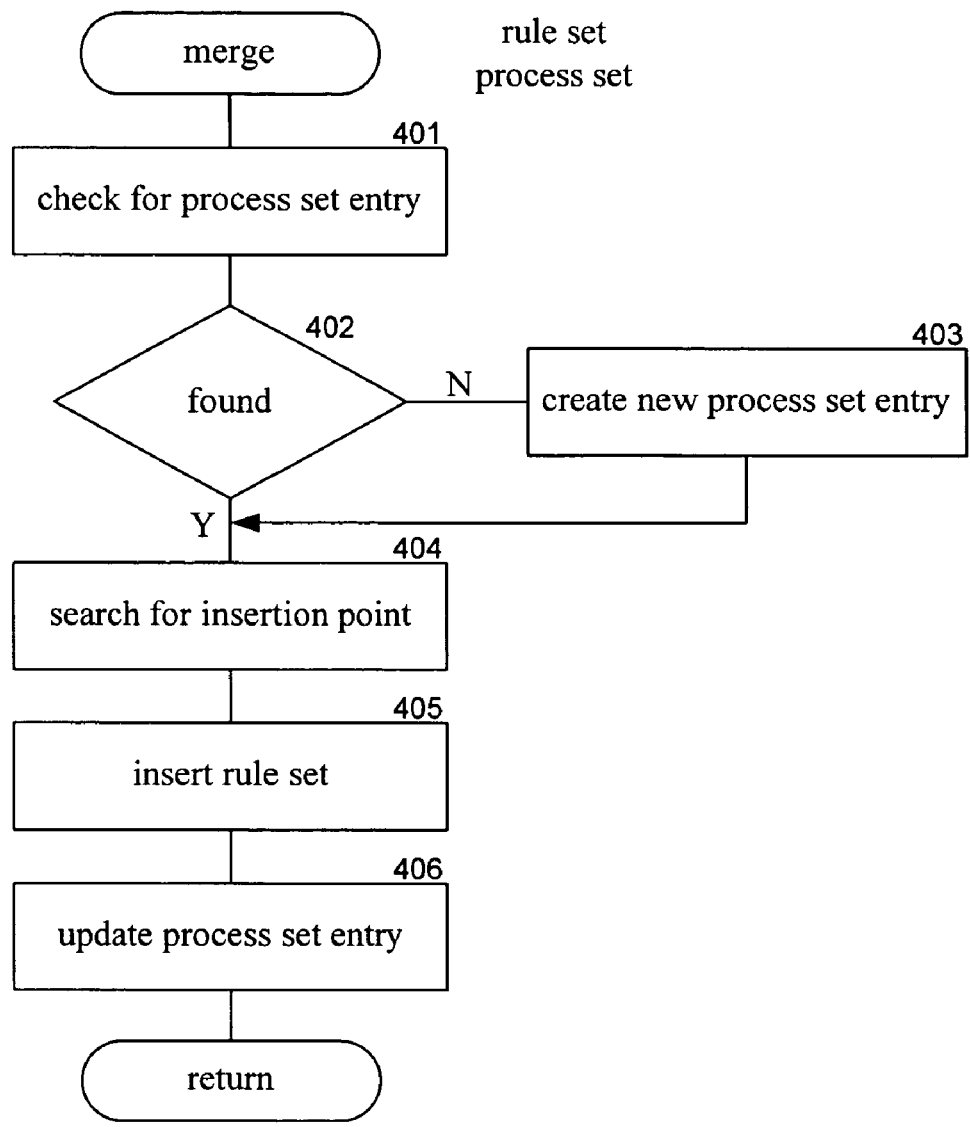
FIG. 4 is a flow diagram that illustrates the processing of the merge component of the rule generator in one embodiment.

FIG. 4 is a flow diagram that illustrates the processing of the merge component of the rule generator in one embodiment. The component executes in user mode. The component is passed a rule set and a process set criterion. The component adds each rule of the rule set to the rule table of the rule list and updates the process set table accordingly. In block 401, the component checks whether the process set table contains an entry for the passed process set criterion. In decision block 402, if an entry is found, then the component continues at block 404, else the component continues at block 403. In block 403, the component creates a new entry in the process set table for the passed process set criterion. In block 404, the component searches for the appropriate insertion point within the rule table for the rules of the passed rule set. The appropriate insertion point is identified based on the rule type and action orderings. In block 405, the component inserts the rules of the rule set at the insertion point within the rule table. In block 406, the component updates the entry in the process set table for the passed process set criterion. When the rules are identified by index within the rule table, the component may need to update other entries in the process set table to reflect the new location within the rule table. Alternatively, different data structures for the rule table may be used during the combining and enforcing processes that are optimized to the specific process. For example, a linked list data structure may be used when combining and a simple list data structure may be used when enforcing. The component then returns.

Figure 5:
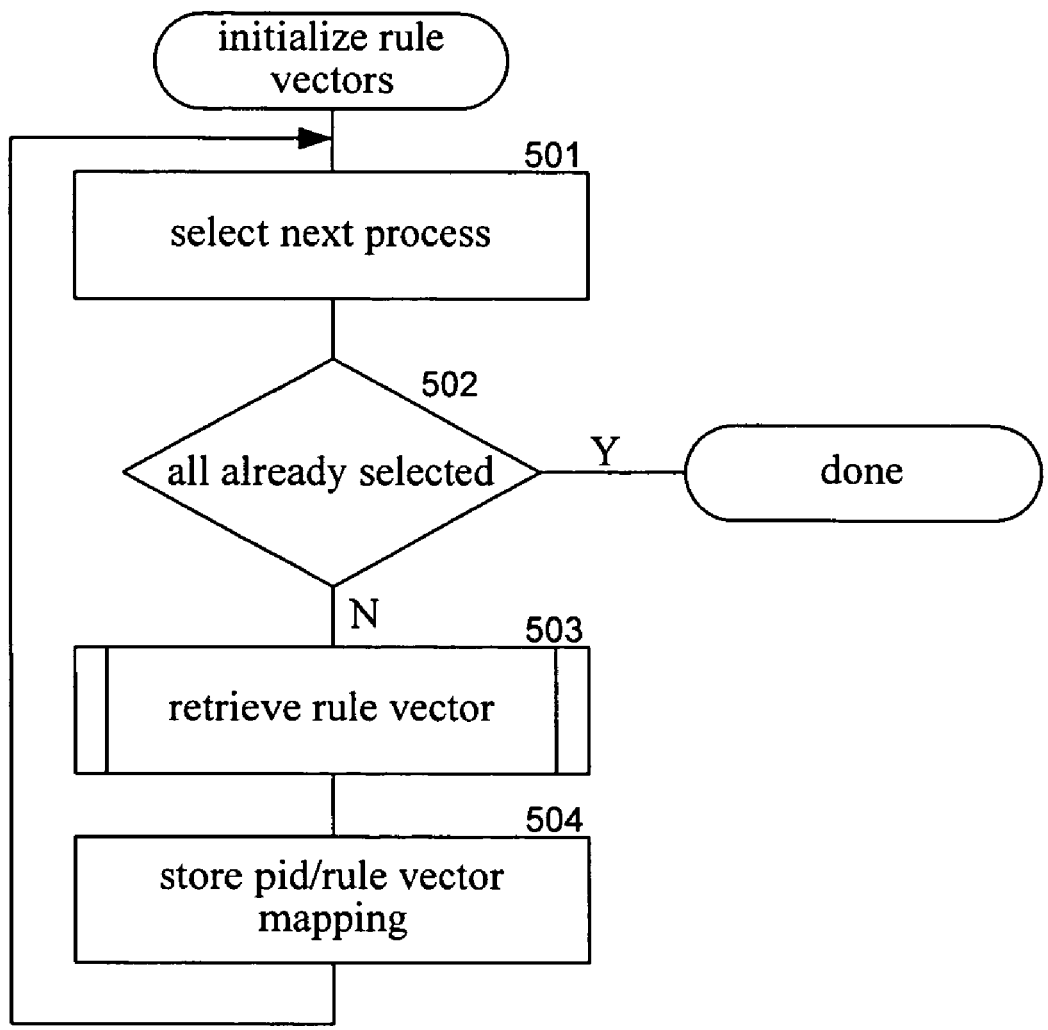
FIG. 5 is a flow diagram that illustrates the processing of an initialize rule vectors component in one embodiment.

FIG. 5 is a flow diagram that illustrates the processing of an initialize rule vectors component in one embodiment. The component executes in kernel mode and may be a sub-component of the rule engine component. The component may be invoked when the security engine component starts up. The component accesses information of the rule list (e.g., via shared memory) and generates the rule vectors for processes. In block 501, the component selects the next process currently executing. In decision block 502, if all the processes have already been selected, then the component completes, else the component continues at block 503. In block 503, the component invokes the retrieve rule vector component to retrieve the rule vector for the selected process. In block 504, the component stores an entry in the process/rule vector mapping for the selected process and rule vector combination. The component then loops to block 501 to select the next process.

Figure 6:
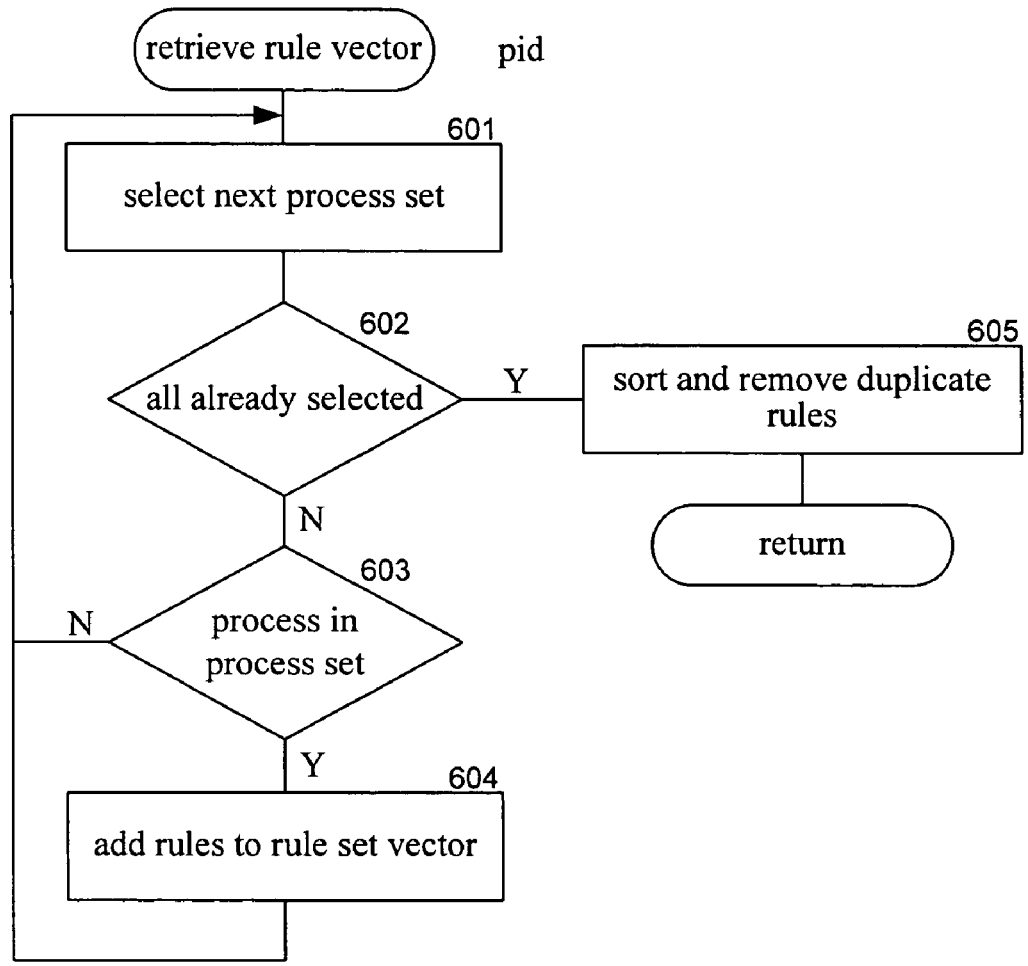
FIG. 6 is a flow diagram that illustrates the processing of the retrieve rule vector component in one embodiment.

FIG. 6 is a flow diagram that illustrates the processing of the retrieve rule vector component in one embodiment. The component is passed a process identifier and identifies the process set criteria that are satisfied by the process. The component then creates a rule vector that identifies each of the rules that are associated with the satisfied process set criteria. In block 601, the component selects the next process set criterion. In decision block 602, if all the process set criteria have already been selected, then the component continues at block 605, else the component continues at block 603. In decision block 603, if the passed process satisfies the selected process set criterion, then the component continues at block 604, else the component loops to block 601 to select the next process set criterion. In block 604, the component adds the rules associated with the selected process set criterion to the rule vector and then loops to block 601 to select the next process set criterion. In block 605, the component sorts the rules within the rule vector, removes any duplicate rules, and then returns.

Figure 7:
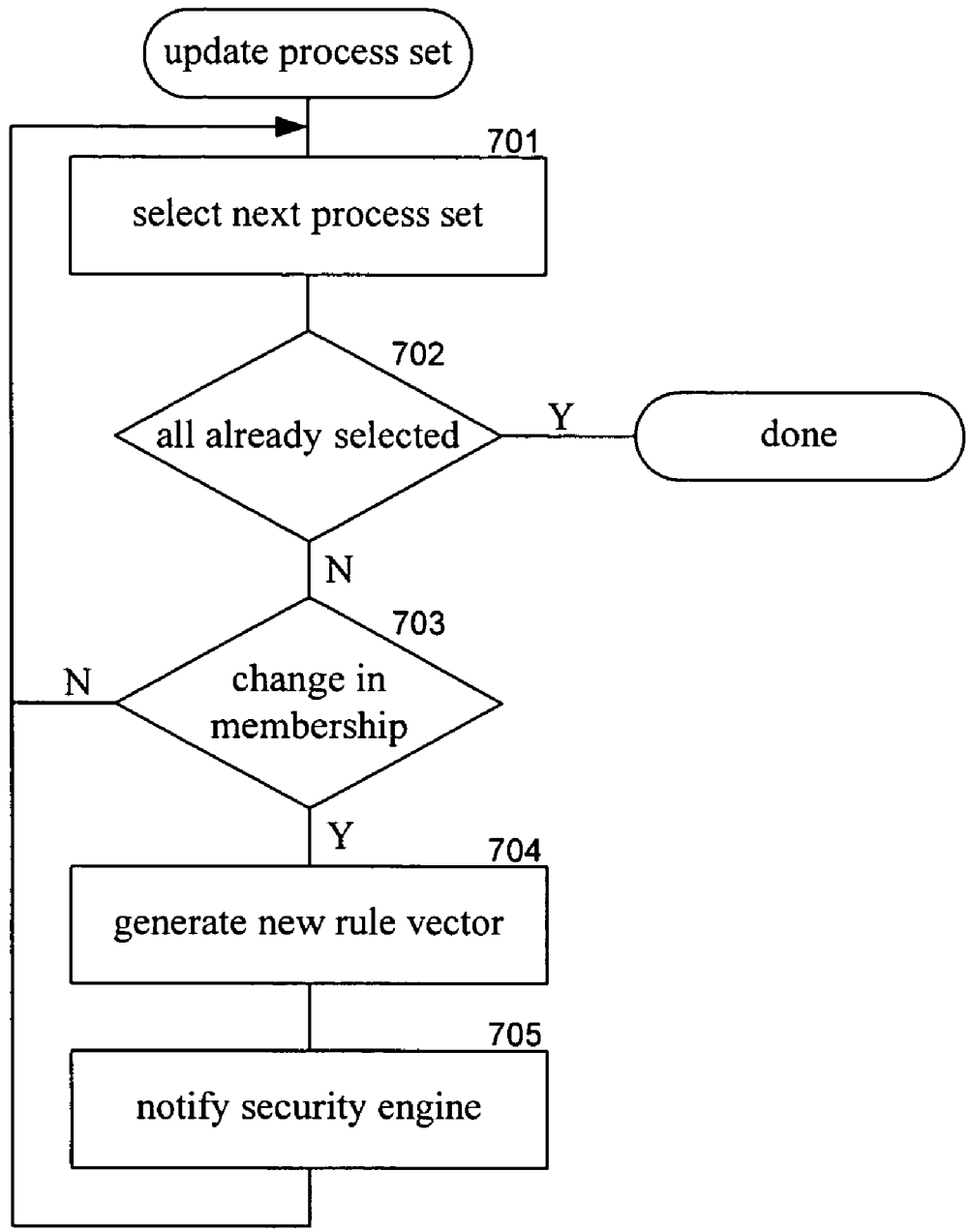
FIG. 7 is a flow diagram that illustrates the processing of an update process set criterion component in one embodiment.

FIG. 7 is a flow diagram that illustrates the processing of an update process set criterion component in one embodiment. This component is invoked when a process set criterion is modified. In block 701, the component selects the next process currently executing on the computer. In decision block 702, if all the processes have already been selected, then the component completes, else the component continues at block 703. In decision block 703, if there has been a change as to whether the selected process satisfies the process set criterion resulting from the update, then the component continues at block 704, else the component loops to block 701 to select the next process. There is a change resulting from the update when the selected process satisfies only one of the previous or updated process set criteria. In block 704, the component generates a new rule vector for the selected process. In block 705, the component notifies the security engine component of the change to the rule vector and then loops to block 701 to select the next process. The security engine can start using the changed rule vector upon notification to affect the dynamic updating and enforcement of the security policies.

Figure 8:
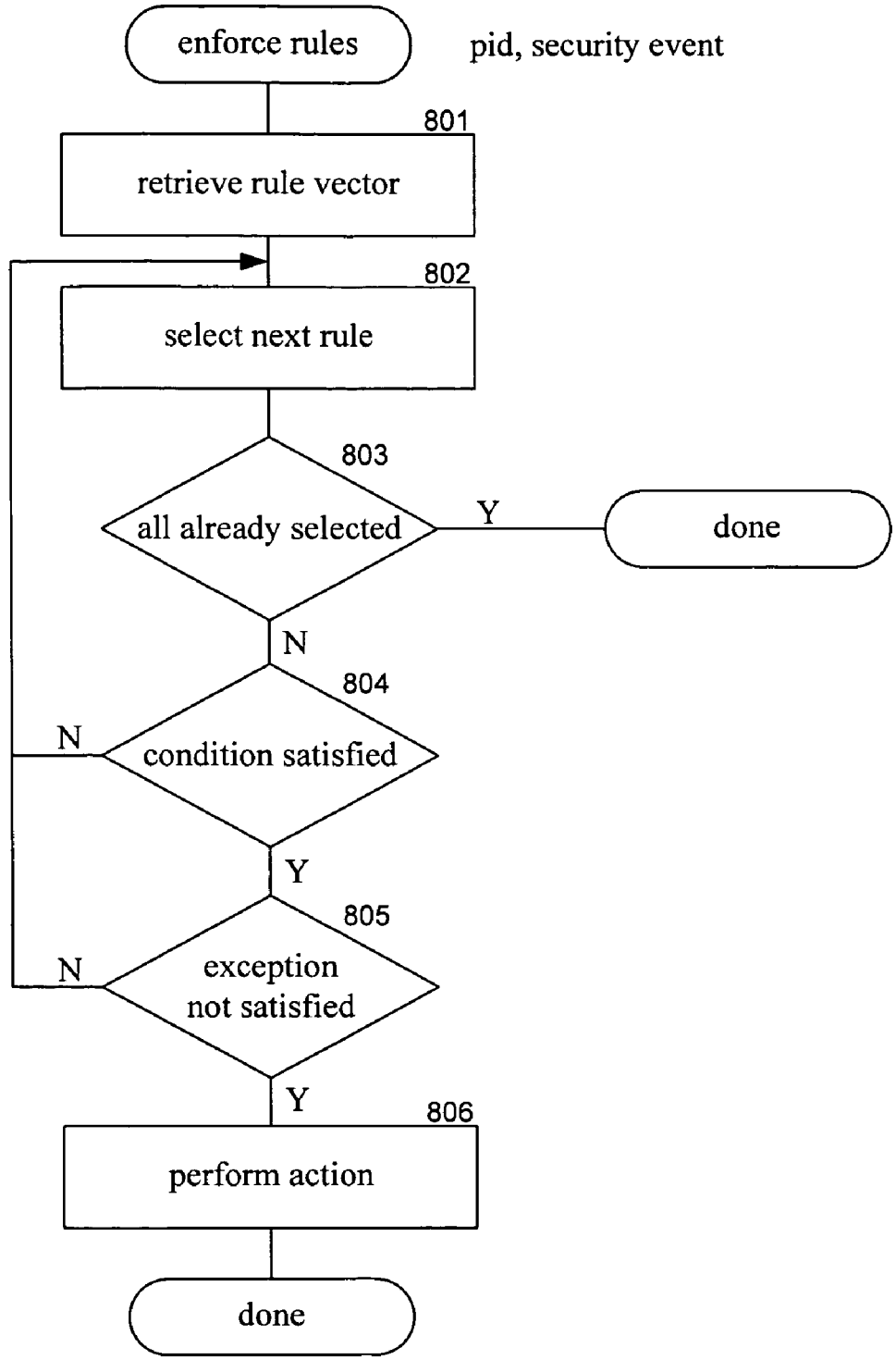
FIG. 8 is a flow diagram that illustrates the processing of an enforce rules sub-component of the security engine component in one embodiment.

FIG. 8 is a flow diagram that illustrates the processing of an enforce rules sub-component of the security engine component in one embodiment. The component executes in kernel mode and is passed a process identifier and a security enforcement event. The component applies the rules identified by the rule vector for the process to the security enforcement event. In block 801, the component retrieves a rule vector for the identified process. In block 802, the component selects in order the next rule within the rule vector. In decision block 803, if all the rules of the rule vector have already been selected, then the component completes, else the component continues at block 804. In decision block 804, if the condition of the selected rule is satisfied, then the component continues at block 805, else the component loops to block 802 to select the next rule. In decision block 805, if the exception of the rule is not satisfied, then the component continues at block 806, else the component loops to block 802 to select the next rule. In block 806, the component performs the action of the rule and then completes.

From the foregoing, it will be appreciated that specific embodiments of the security system have been described herein for purposes of illustration, but that various modifications may be made without deviating from the spirit and scope of the invention. Accordingly, the invention is not limited except as by the appended claims.

We claim:

1. A method in a computer system for enforcing security policies, the method comprising:
   providing a plurality of different security policies, a security policy having a process set criterion and having multiple rules, a process set criterion of a security policy defining attributes of a process to which rules of that security policy are to be applied, each rule having a rule type, a condition, and an action, the rules types including global and application-specific, a rule with a global rule type for being applied to processes that satisfy the process set criterion, a rule with an application-specific rule type for being applied to processes specifically identified by the rule and that satisfy the process set criterion, the actions including allow and deny;
   when in user mode,
      generating a rule list that combines each of the plurality of security policies into the rule list representing a combined security policy, each rule in the rule list associated with the process set criterion of the security policy that contains the rule, the rule list being ordered by rule type and action within rule type, wherein rules with a global rule type are ordered before rules with an application-specific rule type and rules with actions of deny are ordered before rules with actions of allow; and
   when in kernel mode,
      prior to starting a process, identifying the rules of the rule list whose process set criterion is satisfied by the process based on comparison of attributes of the process and attributes defined by the process criterion associated with each rule of the rule list; and
      after identifying the rules of the rule list whose process set criterion is satisfied by the process, starting the process and during execution of the process:
         when a security event relating to the process occurs, applying the identified rules to the security event in the order of the rule list by
            selecting each of the rules in the order of the rule list;
            determining whether the security event satisfies the condition of the selected rule; and
            when it is determined that the security event satisfies the condition of the selected rule, performing the action of the selected rule.

2. A method in a computer system for enforcing security policies, the method comprising:
   providing a plurality of different security policies, a security policy having a process set criterion and having one or more rules, a process set criterion of a security policy defining attributes of a process to which rules of that security policy are to be applied, each rule having a rule type, a condition, and an action;
   in a first privilege mode,
      generating a rule list that includes each of the rules of the plurality of security policies, each rule in the rule list associated with the process set criterion of the security policy that contains the rule, the rule list being ordered by rule type and action within action type; and
   in a second privilege mode,
      when a process is started, identifying the rules of the rule list whose process set criterion is satisfied by the process; and
      when a security event relating to the process occurs, applying the identified rules to the security event in the order of the rule list by selecting each of the rules in the order of the rule list;
         determining whether the security event satisfies the condition of the selected rule; and
         when it is determined that the security event satisfies the condition of the selected rule, performing the action of the rule and stopping the selecting of the identified rules; and
      when a process set criterion changes,
         in the first privilege mode,
            updating the process set criterion of the rule list; and
            providing a notification to the second privilege mode; and
         in the second privilege mode, re-identifying the rules of the rule list for the process so that when a next security event relating to the process occurs, the re-identified rules can be applied
   the first privilege mode is a user mode and the second privilege mode is a kernel mode.

3. The method of claim 1 wherein when a security policy is changed, the identified rules for a process are dynamically updated.

4. The method of claim 2 wherein the rule types include global, application-specific, and default execution scopes.

5. The method of claim 4 wherein the rules are ordered with global before application-specific and application-specific before default.

6. The method of claim 2 wherein the actions include deny and allow and rules with a deny action are ordered before rules with an allow action within each rule type.

7. The method of claim 1 wherein the rule list includes a mapping of each process set criterion to the associated rules.

8. A computer-readable storage medium containing computer-executable instructions implementing a method for controlling a computer system to enforce security policies, the method comprising:
   receiving a rule list that includes a list of the rules of the security policies, each security policy having a process set criterion defining attributes of a process to which rules of that security policy are to be applied, each rule in the rule list associated with the process set criterion of a security policy, each rule having a rule type, condition, and action, the rule list being ordered by rule type, the rule list being generated by combining the rules of the security policies;
   wherein the security policy is enforced in kernel mode and the rule list is generated in user mode
   when a process is started, identifying the rules of the rule list whose process set criterion is satisfied by the process; and
   when a security event relating to the process occurs, applying the identified rules to the security event in the order of the rule list by selecting each of the rules in the order of the rule list;
      determining whether the security event satisfies the condition of the selected rule; and
      when it is determined that the security event satisfies the condition of the selected rule, performing the action of the selected rule and stopping the selecting of the identified rules.

9. The computer-readable storage medium of claim 8 including:
   when a process set criterion changes, identifying the rules of the rule list for a process wherein the change affected whether the process set criterion was satisfied by the process so that when a next security event relating to the process occurs, the identified rules can be applied.

10. The computer-readable storage medium of claim 8 wherein when a security policy is changed, the identified rules for a process are dynamically updated.

11. The computer-readable storage medium of claim 8 wherein the rule types include global, application-specific, and default execution scopes.

12. The computer-readable storage medium of claim 11 wherein the rules are ordered with global before application-specific and application-specific before default.

13. The computer-readable storage medium of claim 8 wherein the actions include deny and allow and rules with a deny action are ordered before rules with an allow action within each rule type.

14. The computer-readable storage medium of claim 8 wherein the rule list includes a mapping of each process set criterion to the associated rules.

15. A computing device for enforcing security policies, comprising:
   a processor; and
   a memory storing:
      a merge component that executes in a first privilege mode that generates a rule list that includes a list of the rules of the security policies, each security policy defining rules and a process set criterion for the security policy, each rule in the rule list having the process set criterion defined by security policy that defines the rule, the rule list being ordered by rule type and action within rule type; and
      an enforcement component that executes in a second privilege mode that identifies the rules of the rule list associated with one or more process set criteria that are satisfied by a process when a process is started and that applies the identified rules to a security event for the process in the order of the rule list
   the first privilege mode is a user mode and the second privilege mode is a kernel mode.

16. The computing device of claim 15 wherein when a security policy is changed, the identified rules for a process are dynamically updated.

17. The computing device of claim 15 wherein the rule types include global, application-specific, and default execution scopes.

18. The computing device of claim 17 wherein the rules are ordered with global before application-specific and application-specific before default.

19. The computing device of claim 17 wherein the actions include deny and allow and rules with a deny action are ordered before rules with an allow action within each rule type.

\* \* \* \* \*